United States Patent
Lee et al.

(10) Patent No.: US 10,630,745 B2
(45) Date of Patent: Apr. 21, 2020

(54) MMT APPARATUS AND MMT METHOD FOR PROCESSING MEDIA DATA

(71) Applicant: Electronics and Telecommunications Research Institute, Daejeon (KR)

(72) Inventors: Jin Young Lee, Seoul (KR); Kug Jin Yun, Daejeon (KR); Won Sik Cheong, Daejeon (KR)

(73) Assignee: Electronics and Telecommunications Research Institute, Daejean (KR)

( * ) Notice: Subject to any disclaimer, the term of this patent is extended or adjusted under 35 U.S.C. 154(b) by 70 days.

(21) Appl. No.: 15/573,430

(22) PCT Filed: Jun. 8, 2016

(86) PCT No.: PCT/KR2016/006027
§ 371 (c)(1),
(2) Date: Nov. 10, 2017

(87) PCT Pub. No.: WO2016/204442
PCT Pub. Date: Dec. 22, 2016

(65) Prior Publication Data
US 2018/0115593 A1    Apr. 26, 2018

(30) Foreign Application Priority Data

Jun. 17, 2015  (KR) .................. 10-2015-0086169
Jun. 1, 2016   (KR) .................. 10-2016-0068335

(51) Int. Cl.
*H04N 7/173* (2011.01)
*H04L 29/06* (2006.01)
(Continued)

(52) U.S. Cl.
CPC ......... *H04L 65/607* (2013.01); *H04N 21/235* (2013.01); *H04N 21/23614* (2013.01);
(Continued)

(58) Field of Classification Search
CPC .......... H04L 65/607; H04N 21/234318; H04N 21/235; H04N 21/23614; H04N 21/23605; H04N 21/64322
See application file for complete search history.

(56) References Cited

U.S. PATENT DOCUMENTS

2013/0297817 A1   11/2013  Bae et al.
2014/0351874 A1   11/2014  Yoo et al.
(Continued)

FOREIGN PATENT DOCUMENTS

JP    05335224 B2    6/2009
KR    101056021 B1   8/2011
(Continued)

OTHER PUBLICATIONS

Information technology—High efficiency coding and media delivery in heterogeneous environments—Part 1: MPEG media transport (MMT); International Standard ISO/IEC 23008-1; Jun. 1, 2014; 98 pages; International Organization for Standardization (ISO) and International Electrotechnical Commission (IEC); Switzerland.
(Continued)

Primary Examiner — Kyu Chae
(74) Attorney, Agent, or Firm — William Park & Associates Ltd.

(57) ABSTRACT

An MMT apparatus and an MMT method for processing media data are disclosed. An MMT apparatus according to one embodiment comprises: an asset file generation unit for generating an asset file including media data; and a signaling message generation unit for generating a signaling message for transmission or consumption of the media data, wherein the generated asset file includes asset correlation information which describes the relevance between a current asset and a relevant asset, which is another asset file constituting the same MMT package as the current asset.

10 Claims, 6 Drawing Sheets

(51) Int. Cl.
*H04N 21/2343* (2011.01)
*H04N 21/235* (2011.01)
*H04N 21/236* (2011.01)
*H04N 21/643* (2011.01)

(52) U.S. Cl.
CPC ............... *H04N 21/234318* (2013.01); *H04N 21/23605* (2013.01); *H04N 21/64322* (2013.01)

(56) References Cited

U.S. PATENT DOCUMENTS

| | | | | |
|---|---|---|---|---|
| 2015/0113577 | A1* | 4/2015 | Yie | H04N 21/2362 725/109 |
| 2015/0120956 | A1* | 4/2015 | Bouazizi | H04L 65/602 709/231 |
| 2015/0201207 | A1 | 7/2015 | Yie et al. | |
| 2016/0073118 | A1* | 3/2016 | Iguchi | H04N 21/236 375/240.01 |

FOREIGN PATENT DOCUMENTS

| | | |
|---|---|---|
| KR | 1020120138687 A | 12/2012 |
| KR | 1020120138693 A | 12/2012 |
| WO | 2012161556 A2 | 11/2012 |
| WO | 2013077662 A1 | 5/2013 |

OTHER PUBLICATIONS

ISO/IEC JTC 1/SC 29 N13989, "Information Technology-High Efficiency Coding and Media Delivery in Heterogeneous Environments—Part 11: MPEG Media Transport Composition Information", Nov. 15, 2013, 69 pages, International Organization for Standardization (ISO) and International Electrotechnical Commission (IEC); Geneva, Switzerland.

* cited by examiner

FIG. 5

```
aligned(8) class MPUBox
    extends FullBox('mmpu', version, 0){ unsigned int(1) is_complete;
    unsigned int(7) reserved;
    unsigned int(32) mpu_sequence_number;

AssetIdentifierBox();

unsigned int(1) is_associated;        ~ 310a
    unsigned int(7) reserved;

if (is_associated){
        unsigned int(8) num_association    ~ 320a for (i=0; i<num_association; i++){
            unsigned int(2) association_type;   ~ 330a
            unsigned int(6) reserved;
            AssetIdentifierBox();
        }
    }
} aligned(8) class AssetIdentifierBox {                ~ 340a
    unsigned int(32) asset_id_scheme;
    unsigned int(32) asset_id_length;
    unsigned int(8) asset_id_value[asset_id_length];
}
```

MMT APPARATUS AND MMT METHOD FOR PROCESSING MEDIA DATA

CROSS-REFERENCE TO RELATED APPLICATION

The present application is a U.S. national stage patent application of PCT/KR2016/006027 filed on Jun. 8, 2016, which claims priority to Korean patent applications: KR10-2015-0086169 filed on Jun. 17, 2015 and KR10-2016-0068335 filed on Jun. 1, 2016 with the Korean Intellectual Property Office, which is incorporated herein by reference in its entirety.

TECHNICAL FIELD

The present invention relates to a MPEG media transport (MMT) technology, and more specifically, to an MMT apparatus and method for processing media data consisting of one or more assets.

BACKGROUND ART

MPEG media transport (hereinafter, referred to as "MMT") is a new standard technology developed by an MPEG systems sub-working group to store and transfer multimedia content. Existing standard technologies developed by the MPEG systems sub-working group define functions required for multimedia content transmission over a broadcasting network, such as packetization, synchronization, multiplexing, and so on, and have been standardized and widely used as an MPEG-2 transport stream (TS) technology. As developed based on existing broadcasting networks, the MPEG-2 TS technology has elements that are not suitable for multimedia content transmission for IPTV broadcasting or mobile broadcasting through an Internet protocol (IP)-based network, which makes said technology inefficient. Thus, the MPEG systems sub-working group has come to realize a need for a new media transport standard in consideration of the new media transmission environment and an anticipated future media transmission environment, and as the result, has developed the MMT standard.

According to the MMT technology, a logical collection of media data is referred to as a package. An MMT package contains one or more assets, presentation information (PI), and transport characteristics (TCs). The asset is a group of medial processing units (hereinafter, referred to as "MPUs") having the same asset ID, containing coded media data, such as video, audio or webpage. The presentation information describes the spatial and temporal relationships among MMT assets for consumption, and the transport characteristics provide unique information related to transmission of a specific asset.

The MMT technology does not support only transmission of assets using an MMT protocol or other transport protocol, but also storage of said assets as individual files, wherein the assets are groups of media data coded through encapsulation. The aforementioned PI is transmitted in a signaling message, and hence if content consisting of multiple assets is stored in a storage medium, said PI cannot be utilized for consumption in the form of an MMT package.

DETAILED DESCRIPTION OF THE INVENTION

Technical Problem

To solve the aforementioned drawbacks, one objective of the present invention is to provide an MPEG media transport (MMT) apparatus and method for processing media data such that the media data can be consumed in the form of an MMT package even when said media data is stored in a storage medium, as well as when said media data is transmitted using an MMT protocol.

To solve the aforementioned drawbacks, another objective of the present invention is to provide an MMT apparatus and method for processing media data, which can describe relationships among multiple assets that constitute content, without presentation information.

Technical Solution

To solve the aforesaid drawbacks, according to one exemplary embodiment of the present invention, there is provided an MPEG media transport (hereinafter, referred to as MMT) apparatus for processing media data, the MMT apparatus including: an asset file generator configured to generate an asset file that contains the media data; and a signaling message generator configured to generate a signaling message for delivery or consumption of the media data, wherein the asset file contains asset association information that describes association between a current asset and another asset file that forms the same MMT package as the current asset.

According to one aspect of the exemplary embodiment, the asset association information may include an associated asset flag that indicates whether the associated asset(s) is present, associated asset number information that indicates a number of the associated assets, association type information that indicates a type of association between the current asset and each of the associated assets, and an associated asset ID that indicates an identifier of the associated asset. In this case, the association type information may contain at least one of necessity information and independent-consumability information, in which necessity information indicates whether or not the associated asset is required to process the current asset and the independent-consumability information indicates whether or not the current asset is consumable independently, without the associated asset. In addition, the association type information may be represented by a combination of the necessity information and the independent-consumability information. Moreover, the association asset information may be described in a media processing unit (MPU) box defined in ISO/IEC 23008-11. Further, the associated asset ID may be described in the same manner as "AssetIdentifierBox" defined in ISO/IEC 23008-11.

According to another aspect of the exemplary embodiment, the asset association information may be contained only when the asset file is stored in a predetermined storage medium.

To solve the aforesaid drawbacks, according to another exemplary embodiment of the present invention, there is provided a method of processing media data in an MMT apparatus, the method including: generating a single asset file that contains the media data; and generating a signaling message for delivery or consumption of the media data, wherein the asset file is generated to contain asset association information that describes association between a current asset and another asset file that forms the same MMT package as the current asset.

According to one aspect of the exemplary embodiment, the asset association information may include an associated asset flag that indicates whether the associated asset(s) is present, associated asset number information that indicates a number of the associated assets, association type information that indicates a type of association between the current asset and each of the associated assets, and an associated asset ID that indicates an identifier of the associated asset. In this case, the association type information may contain at least one of necessity information and independent-consumability information, in which necessity information indicates whether or not the associated asset is required to process the current asset and the independent-consumability information indicates whether or not the current asset is consumable independently, without the associated asset. In addition, the association type information is represented by a combination of the necessity information and the independent-consumability information. Also, in the generation of the asset file, the association asset information may be described in a media processing unit (MPU) box defined in ISO/IEC 23008-11. Moreover, in the generation of the asset file, the associated asset ID may be described in the same manner as "AssetIdentifierBox" defined in ISO/IEC 23008-11.

According to another aspect of the exemplary embodiment, in the generation of the asset file, the asset association information may be contained only when the asset file is stored in a predetermined storage medium.

Advantageous Effects

According to the aforesaid embodiments of the present invention, an asset file contains information about association with a current asset and another asset that forms the same MMT package as the current asset, which is namely asset association information. Accordingly, it is possible to consume a coded media file in the form of an MMT package defined in ISO/IEC 23008-11, without needing specific information that describes association of assets, for example, playback information supported by ISO/IEC 23008-11.

DESCRIPTION OF DRAWINGS

FIG. 5 is a diagram illustrating an example of syntax of asset association information that is described in an MPU box.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Terms used throughout this specification are defined in consideration of functions according to exemplary embodiments, and can be varied according to a purpose of a user or manager, or precedent and so on. Unless otherwise defined, all terms used herein have the same meaning as commonly understood by one of ordinary skill in the art to which this invention belongs.

Figure 1:
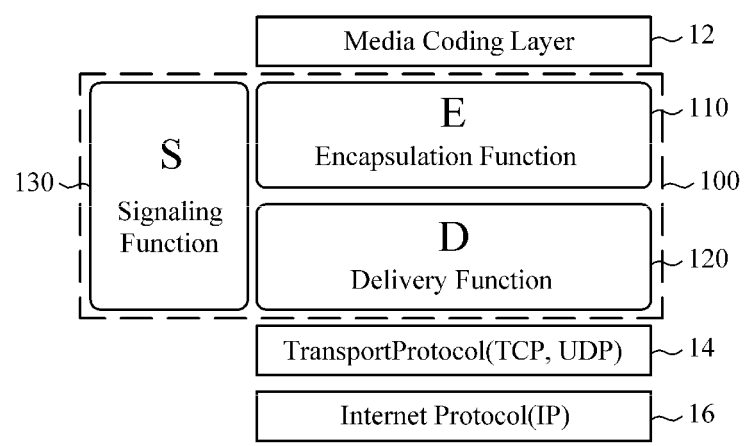
FIG. 1 is a diagram illustrating a hierarchical structure which includes functional areas of an MPEG media transport (MMT) system.

FIG. 1 is a diagram illustrating a hierarchical structure which includes functional areas of an MPEG media transport (MMT) system. Referring to FIG. 1, an MMT system 100 includes an encapsulation function layer (Layer E) 110, a delivery function layer (Layer D) 120, and a signaling function layer (Layer S) 130.

Multimedia data compressed in a media coding layer 12 passes through the encapsulation function layer 110, in which the data is processed into a package of a form similar to a file format, and then the resulting package is output. The encapsulation function layer 110 receives coded media data provided from the media coding layer, generates data fragment or segment that is a small unit for MMT service, and generates access units (AUs) for MMT service by using the data fragment. In addition, the encapsulation function layer 110 aggregates and/or segments the AUs to generate composite content and data of a predetermined format for storing and/or transmitting said composite content.

The delivery function layer 120 may perform network flow multiplexing of media transmitted over a network, network packetization, QoS control, and the like. To be specific, the delivery function layer 120 may convert one or more data units (DUs) output from the encapsulation function layer 110 into an MMT payload format, and then add an MMT transport packet header to create an MMT packet, or may create an RTP packet using a real-time protocol (RTP) that is a conventional transport protocol. Packets formed in the delivery function layer 120 pass through a transport protocol layer 14, such as a user datagram protocol (UDP) layer or a transport control protocol (TCP) layer, before entering an Internet protocol (IP) layer 16 in which the packets are ultimately IP packetized and then transmitted.

The signaling function layer 130 generate a message of a predetermine format that contains control information or signaling information that is required for package delivery and consumption. The generated signaling message may be packetized together with media data into an MMT packet for delivery, or may be packetized into a MMT packet as a separate signaling message and transmitted to a receiving side.

Figure 2:
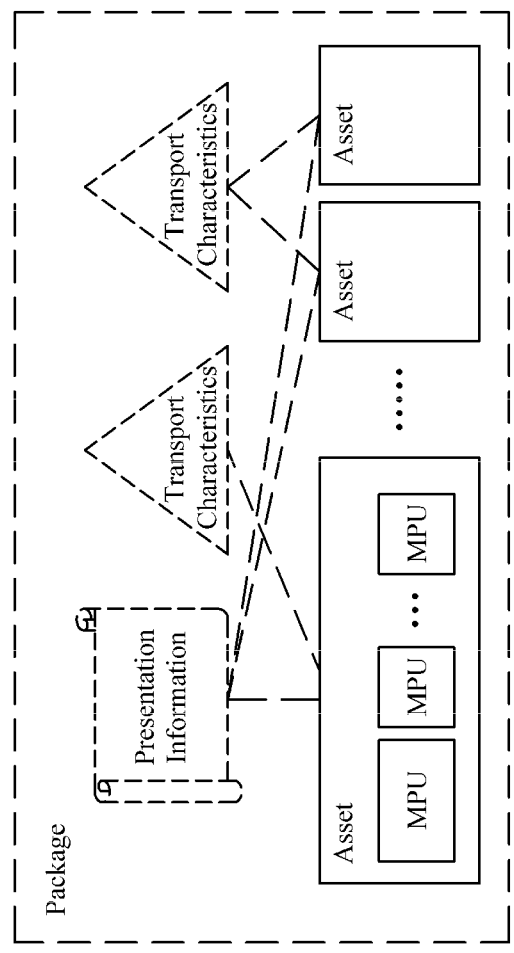
FIG. 2 is a diagram illustrating a logical structure of an MMT package.

FIG. 2 is a diagram illustrating a logical structure of an MMT package, showing elements that constitute the MMT package and the relationship between said elements.

Referring to FIG. 2, the MMT package is a group of media content data and related metadata, and is composed of presentation information (PI), one or more assets, and transport characteristics (TCs). The PI is information that describes the spatial and temporal relationships among MMT assets. The asset is encoded media data, such as audio, video, and webpage, and each asset has an asset ID as an identifier. Each asset may include one or more media processing units (MPUs), each of which is a file in accordance with the International Standard Organization-Base Media File Format (ISO-BMFF) and can be independently consumed. Two successive MPUs in one asset cannot contain the same media sample. In addition, the TC provides QoS information required for asset delivery. One asset only can have one TC, while one TC can be used by multiple assets.

According to the MMT technology, a video file, an audio file, and a caption file that constitute multimedia content are treated as individual assets. In addition, a left-view image file and a right-view image file which constitute the stereoscopic video are treated as individual assets, and a video file which is coded in a base layer using a scalable video coding technology and a video file in an enhancement layer area are also treated as individual assets. In addition, in the MMT technology, transmission or playback of content and associated data processing or service quality control are processed independently on an asset-by-asset basis, and thus in order to consume content, that is, an MMT package, consisting of a plurality of assets, information about temporal and spatial relationships between the assets is essentially required.

Figure 3:
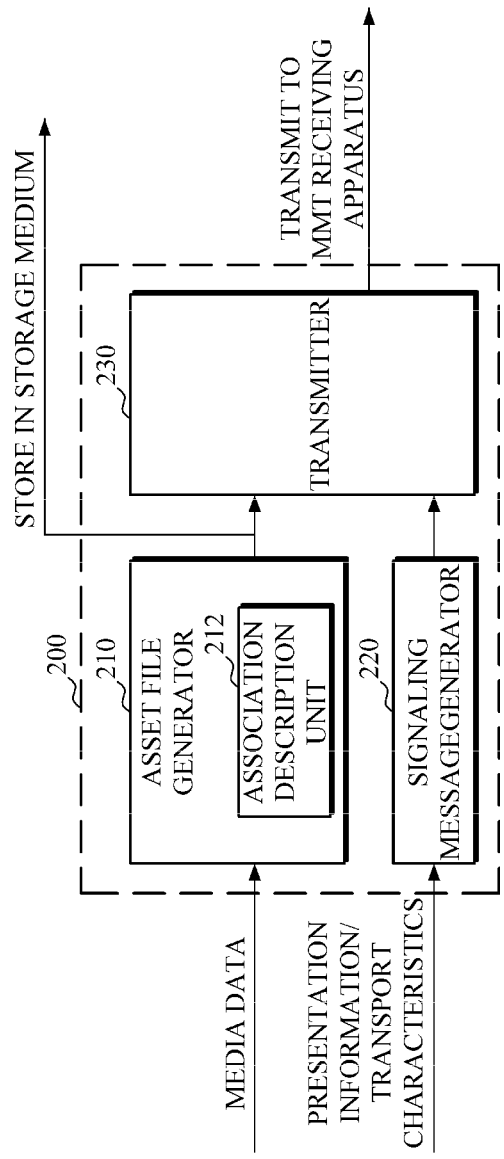
FIG. 3 is a block diagram illustrating an MMT apparatus for processing media data according to an exemplary embodiment of the present invention.

FIG. 3 is a block diagram illustrating an MMT apparatus for processing media data according to an exemplary embodiment of the present invention. Referring to FIG. 3, an MMT apparatus 200 includes an asset file generator 210, and a signaling message generator 220. Also, the MMT apparatus 200 may further include a transmitter 230. All or part of components (or functions) of the MMT apparatus shown in FIG. 3 may be implemented as components (or functions) of an MMT sending entity specified by the MMT standard.

The asset file generator 210 generates an asset file for each asset based on access units (AUs). Here, the "asset file" does not necessarily refer to a single physical file, but may refer to a group of numerous files. In other words, the "asset file" is a group of one or more files, each file containing not only encoded media data of a single asset, but also related information. As described above, a video file, an audio file, and a caption file which all form one MMT package are independently processed as individual assets.

One or more asset files generated by the asset file generator 210 of FIG. 3 may be stored in a storage medium. In this case, each of the generated asset files contains information which describes its association with other asset files that form the same MMT package, that is, asset association information.

Alternatively, the asset files generated by the asset file generator 210 may be input to the transmitter 230 and then transmitted to an MMT receiving apparatus. In this case, the asset files generated by the asset file generator 210 may not necessarily contain asset association information. This is because temporal and spatial association of assets may be described using PI contained in a signaling message generated by the signaling message generator 220. Herein, a case will be described in which asset association information is included in an asset file generated by the asset file generator 210.

The asset file generated by the asset file generator 210 contains media data, such as video data, audio data, and web page. The media data may be composed of one or more MPUs. As described above, the MPU may be a file of a specific format that is encapsulated according to the ISO-BMFF, and said MPU has a unique sequence number as well as an asset ID. The MPUs that constitute the same asset have the same asset IDs. The MPUs contain encoded stereoscopic video data and each MPU contains one media track at most.

According to an exemplary embodiment of the present invention, the asset file generated by the asset file generator 210 includes asset association information. The asset association information is information that describes association between a pertinent asset and other asset files that form the same MMT package. For example, the asset association information may include: information that indicates whether associated assets are present; information that indicates the number of associated assets, if any; information that specifies a type of association, and ID information of associated assets. To this end, the asset file generator 210 may include an association description unit 212. The association description unit 212 may add description of the asset association information to the generated asset file.

Figure 4:
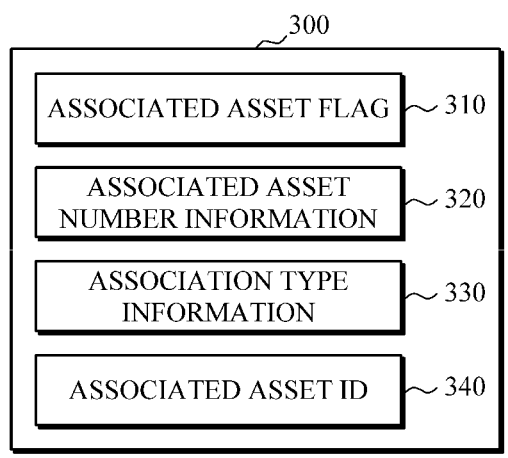
FIG. 4 is a block diagram illustrating a configuration of the asset association information according to an exemplary embodiment of the present invention.

FIG. 4 is a block diagram illustrating a configuration of the asset association information according to an exemplary embodiment of the present invention. Referring to FIG. 4, the asset association information 300 includes an associated asset flag 310, associated asset number information 320, association type information 330, and an associated asset ID 340.

The associated asset flag 310 is information that indicates whether or not there is an asset that is associated with a current asset. Here, the "associated asset" may be an asset that forms the same MMT package as the current asset. The associated asset flag 310 may be represented by syntax, for example, "is_associated". If there are one or more assets associated with the current asset, the associated asset flag 310 may be set to "1", and, if none, the associated asset flag 310 may be set to "0". The associated asset number information 320 indicates the number of assets associated with the current asset. The associated asset number information 320 may be represented by syntax, for example, "num_association". The associated asset number information 320 is included only when the associated asset flag 310 indicates that one or more associated assets exist.

The association type information 330 indicates a type of association between the current asset and each of the associated assets. The association type information 330 may be represented by syntax, for example, "association_type", and the association type information 330 is included only when the associated asset flag 310 indicates that one or more associated assets exist.

According to one aspect of the present invention, the association type information 330 may be used to indicate at least one of "necessity information" and "independent-consumability information". Here, the "necessity information" indicates whether the associated asset is required to process the current asset, and the "independent-consumability information" indicates whether or not the current asset is usable or consumable independently, without the associated asset. For example, the association type information 330 may include either or both the necessity information and the independent-consumability information. In the latter case, each of the necessity information and the independent-consumability information may be represented using one bit, or they may be represented as a combination using two bits.

Table 1 is an example showing values of the association type information 330 and descriptions thereof. In Table 1, the combination of necessity information and independent-consumability information as the association type information 330 is represented by two bits. Here, as the necessity information, "supplementary" indicates that the associated asset is not necessarily required to process the current asset, while "mandatory" indicates that the associated asset must be required to process the current asset. In addition, the independent-consumability information indicates whether or not the current asset is consumable independently without the associated asset.

TABLE 1

| Value | Description |
| --- | --- |
| 00 | Supplementary, consumable independently |
| 01 | Mandatory, not consumable independently |
| 10 | Supplementary, not consumable independently |
| 11 | Reserved |

The associated asset ID 340 indicates an identifier of the associated asset. If two or more associated assets are present, each identifier represents each asset. It is apparent to those skilled in the art that, like the associated asset number information 320 and the association type information 330, the associated asset ID 340 is also included only when it is indicated that one or more associated assets are present. According to one example of the present invention, the associated asset ID 340 may be described in the same manner as "AssetIdentifierBox" defined in ISO/IEC 23008-11.

As described above, the asset file generated by the asset file generator 210 includes the asset association information. The asset association information may be described by the association description unit 212 and is contained in the asset file. According to one aspect of the present invention, the asset association information may be described in an MPU box (MMPU) defined in ISO/IEC 23008-11.

FIG. 5 is a diagram illustrating an example of syntax of asset association information that is described in an MPU box. In FIG. 5, the associated asset flag 310, the associated asset number information 320, the association type information 330, and the associated asset ID 340 are represented by syntaxes "is_associated" 310*a*, "num_association" 320*a*, "association type" 330*a*, and "assetIdentifierBox" 340*a*, respectively.

Figure 6:
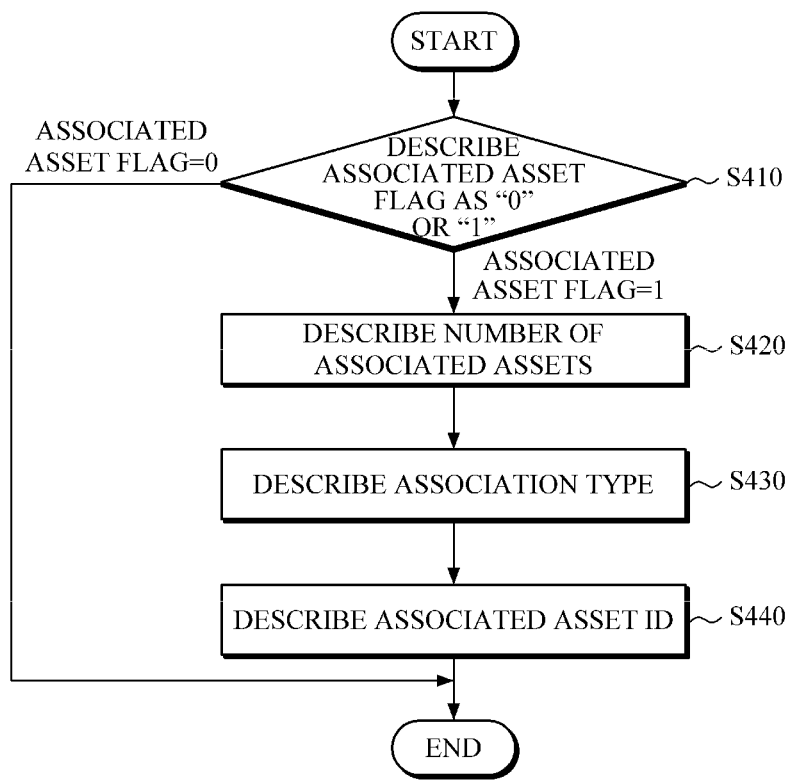
FIG. 6 is a flowchart illustrating an example of a method of processing media data in an MMT apparatus according to an exemplary embodiment of the present invention.

FIG. 6 is a flowchart illustrating an example of a method of processing media data in an MMT apparatus according to an exemplary embodiment of the present invention. The flowchart shown in FIG. 6 may be performed by the MMT apparatus described with reference to FIGS. 3 to 5. Therefore, what is not described hereinafter may be applied the same descriptions of the MMT apparatus made with reference to FIGS. 3 to 5.

Referring to FIG. 6, the MMT apparatus describes the associated asset flag as "0" or "1", as depicted in S410. To this end, the MMT apparatus may determine whether there is an asset associated with a current asset, and may set the associated asset flag as "0" or "1" according to the determination. Here, "0" and "1" may indicate the absence and presence of the associated asset, which are only exemplary. If, in S410, the associated asset flag is described as "0", the following operations S420 to S440 may be omitted.

If, in S410, the associated asset flag is described as "1", that is, there is an asset associated with the current asset, the MMT apparatus describes the number of associated assets, as depicted in S420. Then MMT apparatus describes the association type of each associated asset, as depicted in S430, for which examples of the association types are as described with reference to Table 1. Also, the MMT apparatus describes ID of each associated asset, as depicted in S440. In the flowchart of FIG. 6, the operations S420, S430, and S440 are shown as being performed sequentially, which are only exemplary, and the order of the operations S420, S430, and S440 may be switched or two or more operations may be performed simultaneously.

Tables 2 to 4 show examples of asset association information of each of media data that constitute an MMT package in the MMT apparatus according to the exemplary embodiment of the present invention. The example shown in Table 2 is a case of an MMT package with one video, one audio and one caption file; the example shown in Table 3 is the case of an MMT package with service-compatible stereoscopic video and audio; and the example shown in Table 4 is a case of an MMT package which includes scalable video coding (SVC) video with three layers. In Tables 2 to 4, syntaxes, "asset_id", "is_associated", "num_association", "association_type", and "asset_id (associated)" indicate a current asset's ID, an associated asset flag, associated asset number information, association information type information and an associated asset ID, respectively.

TABLE 2

| Asset | Video | Audio | Caption |
|---|---|---|---|
| asset_id | 0001 | 0002 | 0003 |
| is_associated | 1 | 1 | 1 |
| num_association | 2 | 1 | 1 |
| association_type | 00   00 | 00 | 01 |
| asset_id (associated) | 0002   0003 | 0001 | 0001 |

TABLE 3

| Asset | Left view | Right view | Audio |
|---|---|---|---|
| asset_id | 0001 | 0002 | 0003 |
| is_associated | 1 | 1 | 1 |
| num_association | 2 | 1 | 1 |
| association_type | 00   00 | 01 | 01 |
| asset_id (associated) | 0002   0003 | 0001 | 0001 |

TABLE 4

| Asset | Asset 1 | Asset 2 | Asset 3 |
|---|---|---|---|
| SVC Layer Type | Base | Enhance 1 | Enhance 2 |
| asset_id | 0001 | 0002 | 0003 |
| is_associated | 1 | 1 | 1 |
| num_association | 2 | 2 | 2 |
| association_type | 00   00 | 01   10 | 01   01 |
| asset_id (associated) | 0002   0003 | 0001   0003 | 0001   0002 |

Referring back to FIG. 3, the signaling message generator 220 generates a signaling message for delivery and/or consumption of stereoscopic video data. Here, the signaling message is a message of a format specified in ISO/IEC 23008-11, including information in the form of signaling tables or descriptors. For example, the signaling message generated by the signaling message generator 220 may contain the aforesaid asset association information as part of information that represents the temporal and spatial relationships between the assets. However, the exemplary embodiment of the present invention is not limited thereto, such that the signaling message generated by the signaling message generator 220 may not contain the aforementioned asset association information.

The transmitter 230 receives the asset file generated by the asset file generator 210 and/or the signaling message generated by the signaling message generator 220, and transmits the received file and/or message to an MMT receiving entity. Here, the transmitter 230 may convert the received asset file and/or the signaling message into an MMT packet according to an MMT protocol (MMTP) that conforms to ISO/IEC 23008-11, and transmits the MMT packet to the MMT receiving apparatus. However, the exemplary embodiment is not limited thereto, such that the transmitter 230 may transmit the asset file and/or the signaling message to the MMT receiving apparatus according to other Internet transport protocol, a real-time transport protocol, or a 3D broadcasting protocol.

The above-described device according to the exemplary embodiment of the present invention may be realized in the form of a hardware component, a software component, and/or a combination of a hardware component and a software component. For example, the device and corresponding components according to the above-described exemplary embodiments of the present invention may be realized by using at least one or more universal computers or special-purpose computers, such as a processor, a controller, an arithmetic logic unit (ALU), a digital signal processor, a field programmable array (FPA), a programmable logic unit (PLU), a microprocessor, or any type of device that can execute and respond to an instruction (or command). A processing device may execute an operating system (OS) and at least one or more software application, which is executed within the operating system (OS). Additionally, the processing device may respond to the execution of a software application, so as to access, store, manipulate, process, and generate data. In order to facilitate and simplify the understanding of the present invention, the present invention may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be configured herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method according to the exemplary embodiment of the present invention may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the medium may correspond to a program command that is specifically designed and configured for the exemplary embodiments of the present invention, or the program command may correspond to a program command that is disclosed and available to anyone skilled in or related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be efficiently applied to procedures or devices that are related to delivery or transmission of media data.

The invention claimed is:

1. An MPEG media transport (hereinafter, referred to as MMT) apparatus for processing media data, the MMT apparatus comprising:
a processor; and
a memory configured to store commands executed by the processor, wherein the commands include:
a first command to generate an asset file that contains the media data; and
a second command to generate a signaling message for delivery or consumption of the media data,
wherein the asset file contains asset association information that describes association between a current asset and another asset file that forms the same MMT package as the current asset,
wherein the asset association information includes association type information that indicates a type of association between the current asset and each of associated assets,
wherein the association type information is represented by two bits as a combination of necessity information which indicates whether or not the associated asset is required to process the current asset and independent-consumability information which indicates whether or not the current asset is consumable independently, without the associated asset, and
wherein the necessity information is represented as "supplementary" indicating that the associated asset is not necessarily required to process the current asset or as "mandatory" indicating that the associated asset must be required to process the current asset.

2. The MMT apparatus of claim 1, wherein the asset association information further includes an associated asset flag that indicates whether the associated asset is present, associated asset number information that indicates a number of the associated assets, and an associated asset ID that indicates an identifier of the associated asset.

3. The MMT apparatus of claim 1, wherein the asset association information is described in a media processing unit (MPU) box defined in ISO/IEC 23008-1.

4. The MMT apparatus of claim 2, wherein the associated asset ID is described in the same manner as "AssetIdentifierBox" defined in ISO/IEC 23008-1.

5. The MMT apparatus of claim 1, wherein the asset association information is contained only when the asset file is stored in a predetermined storage medium.

6. A method of processing media data in an MMT apparatus, the method comprising:
generating, by a processor, a single asset file that contains the media data; and generating, by the processor, a signaling message for delivery or consumption of the media data, wherein the asset file is generated to contain asset association information that describes association between a current asset and another asset file that forms the same MMT package as the current asset, wherein the asset association information includes association type information that indicates a type of association between the current asset and each of associated assets, wherein the association type information is represented by two bits as a combination of necessity information which indicates whether or not the associated asset is required to process the current asset and independent-consumability information which indicates whether or not the current asset is consumable independently, without the associated asset, and wherein the necessity information is represented as "supplementary" indicating that the associated asset is not necessarily required to process the current asset or as "mandatory" indicating that the associated asset must be required to process the current asset.

7. The method of claim 6, wherein the asset association information further includes an associated asset flag that indicates whether the associated asset is present, associated asset number information that indicates a number of the associated assets, and an associated asset ID that indicates an identifier of the associated asset.

8. The method of claim 6, wherein the asset association information is described in a media processing unit (MPU) box defined in ISO/IEC 23008-1.

9. The method of claim 7, the associated asset ID is described in the same manner as "AssetIdentifierBox" defined in ISO/IEC 23008-1.

10. The method of claim 6, wherein the asset association information is contained only when the asset file is stored in a predetermined storage medium.

* * * * *